United States Patent
Okada et al.

(10) Patent No.: US 8,144,932 B2
(45) Date of Patent: Mar. 27, 2012

(54) IMAGE PROCESSING APPARATUS, IMAGE PROCESSING METHOD, AND INTERFACE APPARATUS

(75) Inventors: Ryuzo Okada, Kanagawa (JP); Tsukasa Ike, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 151 days.

(21) Appl. No.: 12/712,746

(22) Filed: Feb. 25, 2010

(65) Prior Publication Data
US 2011/0013805 A1    Jan. 20, 2011

Related U.S. Application Data

(63) Continuation of application No. PCT/JP2009/003340, filed on Jul. 15, 2009.

(51) Int. Cl.
*G06K 9/00* (2006.01)
(52) U.S. Cl. ......... 382/103; 382/160; 382/190; 382/155
(58) Field of Classification Search .................. 382/160, 382/155, 16, 103, 170; 348/170, 103, 165, 348/190, 203
See application file for complete search history.

(56) References Cited

U.S. PATENT DOCUMENTS

| | | | |
|---|---|---|---|
| 7,719,569 B2* | 5/2010 | Ohtake et al. | 348/170 |
| 8,013,890 B2* | 9/2011 | Ohtake et al. | 348/170 |
| 2007/0092134 A1* | 4/2007 | Fukui et al. | 382/160 |

OTHER PUBLICATIONS

Mita et al., "Discriminative Feature Co-occurrence Selection for Object Detection," Journal of Latex Class Files (Aug. 2002), I:1-12.
Dalal et al., "Histograms of Oriented Gradients for Human Detection," IEEE Computer Vision and Pattern Recognition (2005), pp. 886-893.
Watanabe et al, "Co-occurrence Histograms of Oriented Gradients for Pedestrian Detection," Proceedings of the 3$^{rd}$ Pacific Rim Symposium on Advances in Image and Video Technology (2009), pp. 37-47.
Stenger; "Template-Based Hand Pose Recognition Using Multiple Cues", Proceedings of Asian Conference on Computer Vision, LNCS 3852, pp. 551-560, (2006).

* cited by examiner

*Primary Examiner* — Vikkram Bali
*Assistant Examiner* — Nancy Bitar
(74) *Attorney, Agent, or Firm* — Finnegan, Henderson, Farabow, Garrett & Dunner, L.L.P.

(57) ABSTRACT

In order to detect a specific detection object from an input image, a color serving as a reference is calculated in a reference image region. The difference for each color component between each pixel in the detection window and the reference color is calculated. Whether or not the detection object is included in the detection window is discriminated by a feature vector indicating how the difference is distributed in the detection window.

7 Claims, 8 Drawing Sheets

IMAGE PROCESSING APPARATUS, IMAGE PROCESSING METHOD, AND INTERFACE APPARATUS

CROSS REFERENCE TO RELATED APPLICATION

This application is based upon and claims the benefit of priority from the prior International Application No. JP2009/3340 filed on 2009/07/15; the entire contents of which are incorporated herein by reference.

FIELD

The disclosure relates to an image processing apparatus and an interface apparatus, for discriminating whether or not a specific object is present in an image.

BACKGROUND

There is a method in which whether or not a specific detection object which is desired to be detected is present in a picked-up image is determined using a previously formed classifier. How the detection object present in the image looks changes variously according to a minute difference in viewing direction or a minute difference between individual objects. Even when there are such differences, in order to keep the detection precision, the feature vectors are calculated from the image, so that the object is discriminated based on the feature vectors.

When the detection object has a specific color, there is a method using the color. However, the color largely varies depending upon imaging environment such as the color of illumination and setting of a camera. Thus, when the color in a specific region in the picked-up image is known, there is proposed a method in which a detection object is detected using the relative color relationship with the color. For example, in JP-A-2007-122218 (U.S. Patent Application Publication No. 2007/0092134), in order to detect a hand, a face, which is relatively easy to detect, is firstly detected. Then, hand detection is performed in the candidate image region of the hand which has a color close to the skin color of the detected face. However, with this method, when an object similar in color to the face is present in the image, the hand region is not extracted properly. Accordingly, the position and the shape cannot be determined properly.

In TEMPLATE-BASED HAND POSE RECOGNITION USING MULTIPLE CUES, B. Stenger, Proc. ACCV, pages 551-560, January 2006, similarly, a face is detected to form a skin color model. Using the gradient direction of the skin color intensity calculated using the skin color model, a hand is detected by temperate matching. However template matching is not robust against changes in shape of the hand.

SUMMARY

In accordance with an aspect of the disclosure, it becomes possible to perform detection which is robust and is high in precision against a change in imaging environment and a change in shape of the detection object.

BRIEF DESCRIPTION OF THE DRAWINGS

Aspects of this disclosure will become apparent upon reading the following detailed description and upon reference to the accompanying drawings. The description and the associated drawings are provided to illustrate embodiments of the invention and not limited to the scope of the invention.

DETAILED DESCRIPTION

Below, embodiments of the present invention will be described. Incidentally, configurations and processings operating similarly to each other are given common signs and numerals, and repetitive description will be omitted.

First Embodiment

An image processing apparatus of this embodiment discriminates whether or not a desired detection object is present in an input image, and outputs the discrimination result. In this embodiment, a description will be given of a method for detecting the region of fingers within the input image. For example, the hand gesture can be detected according to the detection results of the region of fingers. For example, by implementing this embodiment on a television set or a PC, a user is capable of controlling them by his/her hand gestures. As an example, the user of the PC is capable of moving mouse cursor according to the motion of his/her hand and clicking by making his/her thumb upright. This case will be described below.

Figure 1:
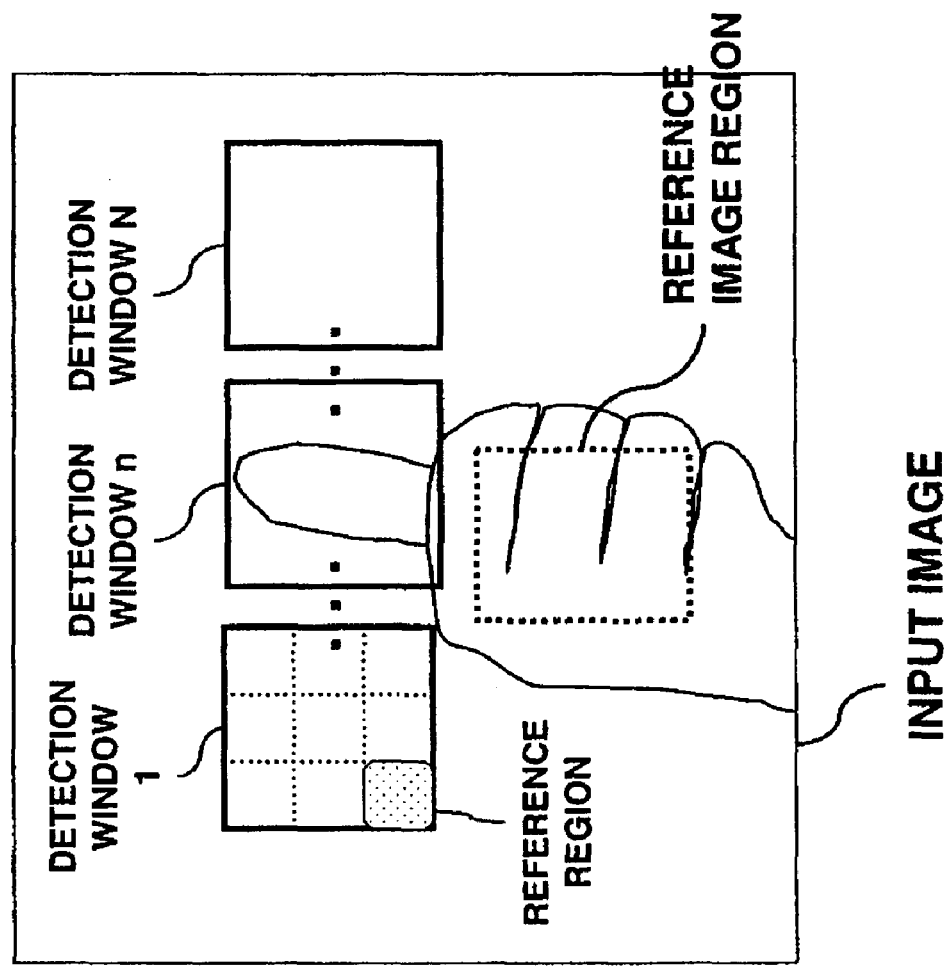
FIG. 1 is an explanatory view showing an example of a reference image region and detection windows for detecting a thumb above a fist.

FIG. 1 is a view showing an example in which a thumb is detected from an input image. A fist which is relatively easy to detect is detected from the input image. With the region of the fist as a reference image region, the mean color of the reference image region (hereinafter, referred to as a reference color) is calculated. It is presumed that the thumb is located above the detected fist. Therefore, at the upper region of the detected fist, detection windows (1 . . . n . . . N) are set. It is discriminated whether or not a thumb is included in the detection windows. Incidentally, the reference image region is not limited to the example of FIG. 1. For example, there may be adopted a method in which a human hand is detected with the central portion of the face as a reference image region. A histogram is calculated for each local region obtained by dividing the inside of the detection window, thereby to calculate a feature vector. The details of the method for calculating the histogram or the feature vector will be described later.

Figure 2:
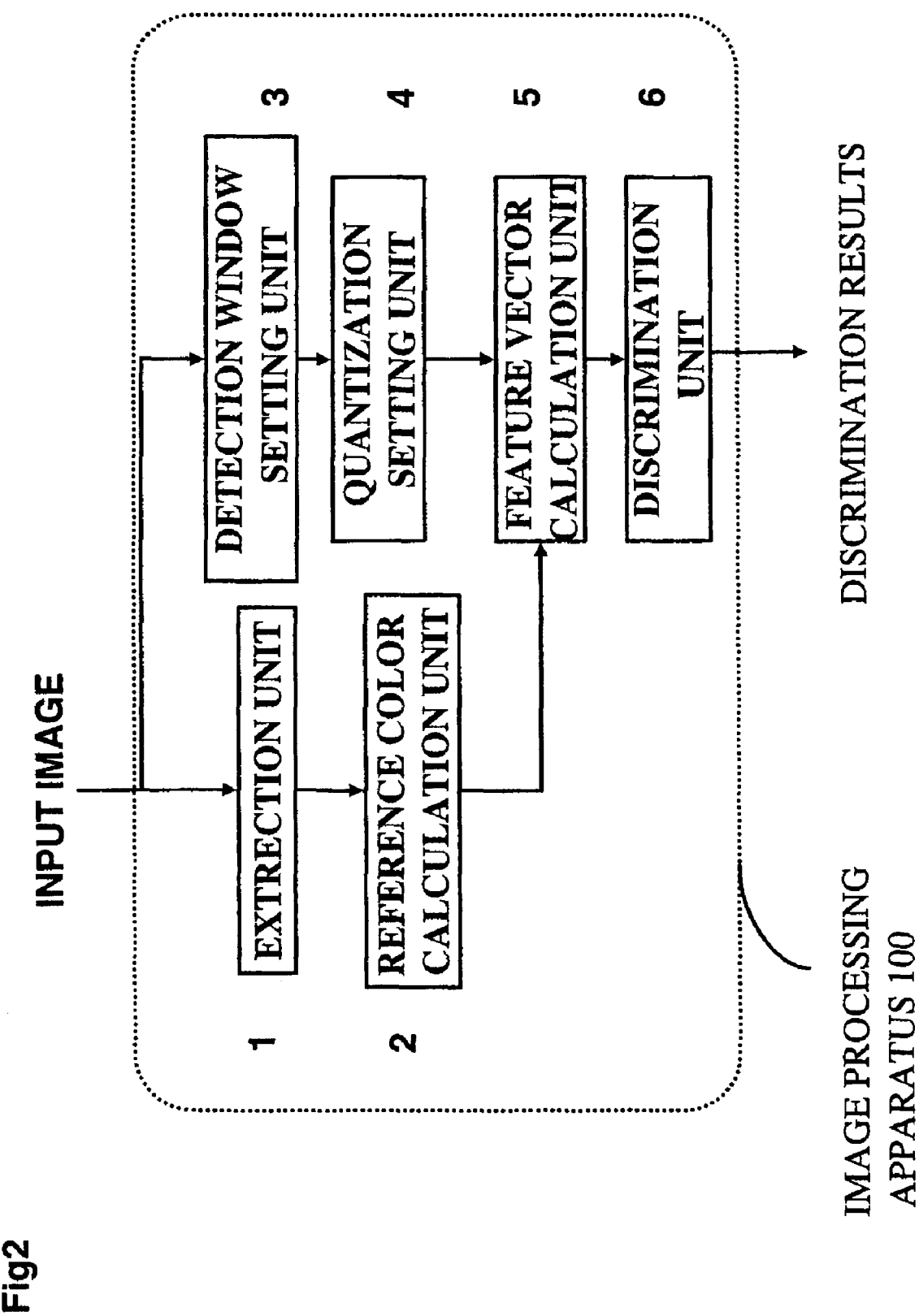
FIG. 2 is a view showing an image processing apparatus of a first embodiment.

FIG. 2 is a view showing an image processing apparatus 100 of this embodiment.

The image processing apparatus 100 has an extraction unit 1, a reference color calculation unit 2, a detection window setting unit 3, a quantization setting unit 4, a feature vector calculation unit 5, and a discrimination unit 6.

The extraction unit 1 extracts a reference image region for extracting the color serving as the reference from the input image. When the position of a fist is previously known, the known fist region of the input image can also be used as a reference image region. Alternatively, the following procedure can also be employed: by utilizing an existing object detection technique using luminance information, a fist is detected, and the detected fist region is used as a reference image region. As the existing object detection technique, for example, the following is used: *DISCRIMINATIVE FEATURE CO-OCCURRENCE SELECTION FOR OBJECT DETECTION* T. Mita, T. Kaneko, B. Stenger, O. Hori, IEEE T. PAMI, Vol. 30, No. 7, pages 1257-1269, July 2008.

The reference color calculation unit 2 calculates a color serving as a reference within the reference image region extracted at the extraction unit 1. As the reference color, a statistic such as the mean value, the median, or the mode of the colors within the reference image region is used. As the colorimetric system, the three-primary color (RGB) space, the YUV space, the LAB space, the HSV space, or the like can also be used. Alternatively, it can be used except for the luminance information. In that case, for example, there are the following methods: the Y component of the YUV space is removed; and the RGB space is normalized with luminance information. In this embodiment, a description will be given of an example using the mean value of the YUV space. Below, respective components of the reference color will be described as $(Y_m, U_m, V_m)$.

The detection window setting unit 3 sets a detection window for determining whether or not a thumb is present. In the example of FIG. 1, on the assumption that a thumb is present at the upper part of the fist, a plurality of regions present relatively at the upper part with respect to the reference image region are set as N detection windows. The method for setting the detection windows includes other various methods. When the relative relationship in position and size between the reference image region and the detection object can be previously presumed, setting may also be made while successively changing the position and the size of the detection window within the region in which the detection object can be present. Alternatively, the detection windows may also be successively set while variously changing the size and the position over the entire screen.

The quantization setting unit 4 sets M bins for forming a color histogram in each local region at the subsequent feature vector calculation unit 5. The histogram is a frequency distribution diagram. The range in which the value (color for the color histogram) can be obtained is divided into regions of proper numerical value ranges referred to as bins. When the value is included in the range of the bin, the frequency of the bin is increased by, for example, 1. Incidentally, the frequency to be increased may be not 1, but a weighted value. The width of the numerical value range is referred to as a quantization width. The quantization setting unit 4 sets the numerical value range of each bin (which will be hereinafter referred to as a quantization method). Below, the setting method thereof will be described.

The difference between the color $(Y_i, U_i, V_i)$ of a pixel i in a local region and a reference color $(Y_m, U_m, V_m)$ is $(Y_i-Y_m, U_i-U_m, V_i-V_m)$. The simplest quantization method is a method wherein the numerical value range in which each component of the color space can be obtained is divided into M equal parts. Alternatively, the quantization method can also be set from images of training samples. The latter is often higher in performance. Below, a description will be given of the quantization method using training sample images. A large number of sets of the reference image region of the fist central part which is a reference image region, and an image of a thumb which is a detection object picked up in the same image are assumed to be given. For each pixel $(Y_i, U_i, V_i)$ of an image region in which a thumb as the detection object has been imaged, the difference $(Y_i-Y_m, U_i-U_m, V_i-V_m)$ from the reference color $(Y_m, U_m, V_m)$ can be calculated. The difference $(Y_i-Y_m, U_i-U_m, V_i-V_m)$ is calculated for all the training samples, to form the color histogram for each color component thereof.

Figure 3:
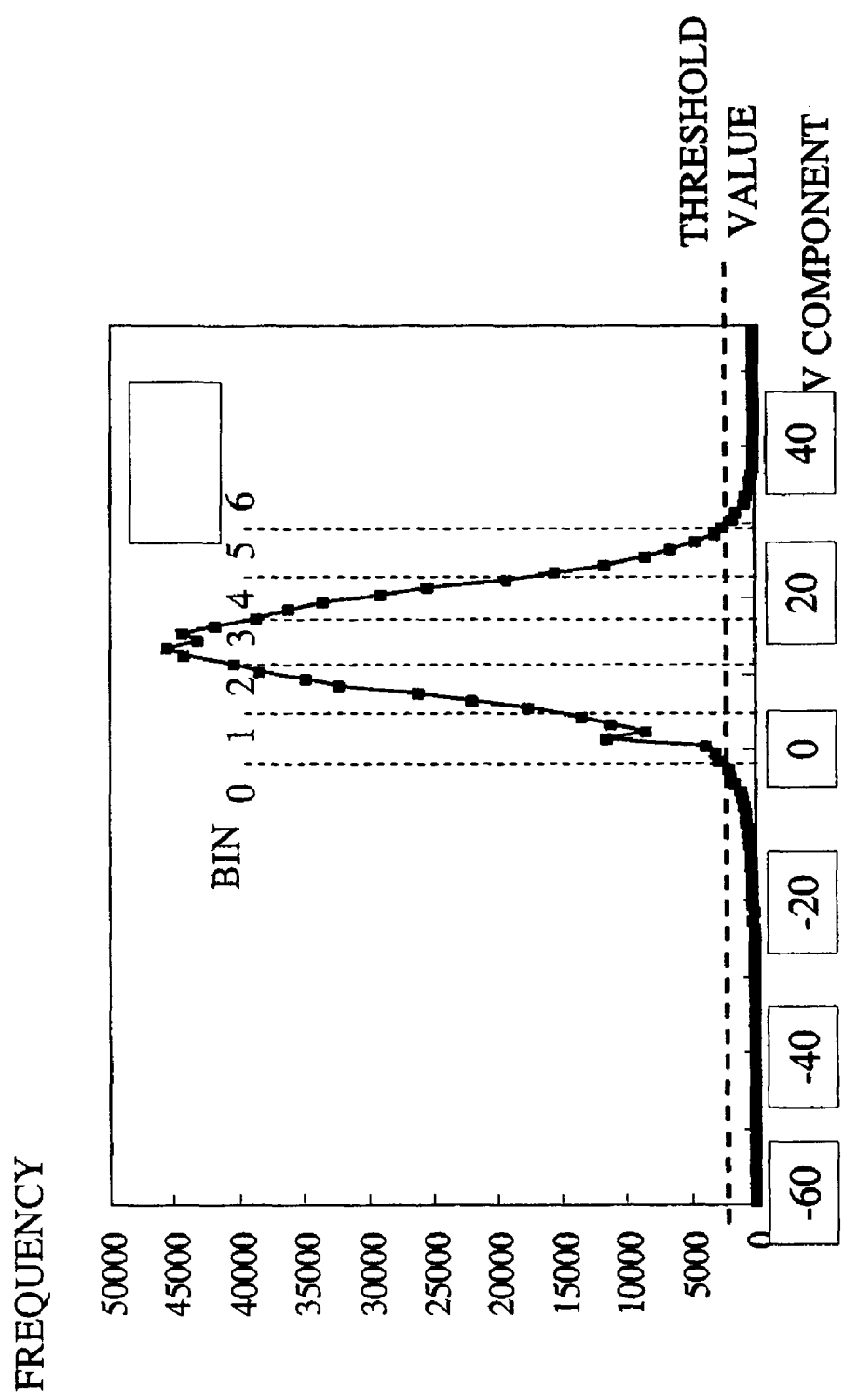
FIG. 3 is a view showing an example of the color histogram and quantization calculated from training samples.

FIG. 3 is a view showing an example of the color histogram on the V component of the YUV space calculated from the training samples of the fist and the thumb, and an example of a method for setting the bins of the V component. The V component in a numerical value range with a larger histogram frequency than the threshold value is divided into equal M-K parts (M>>K), and the region with a threshold value or less is divided into K equal parts. In other words, for the numerical value range of the V component occurring at a high frequency, the quantization width is set finely. As for the numerical value range of the V component with a lower frequency other than this, the width of the quantization is set coarsely. FIG. 3 shows an example where M=7 and K=2.

The feature vector calculation unit 5 calculates the difference for each component $(Y_i-Y_m, U_i-U_m, V_i-V_m)$ between the color of each pixel in the detection window and the reference color $(Y_m, U_m, V_m)$ calculated by the reference color calculation unit 2. The difference for each component $(Y_i-Y_m, U_i-U_m, V_i-V_m)$ is quantized according to the quantization method set at the quantization setting unit 4. For each local region obtained by dividing the inside of the detection window, the relative color histogram is formed. Then, a feature vector is formed by concatenating the relative color histograms whose magnitude is normalized to be 1.

Figure 4:
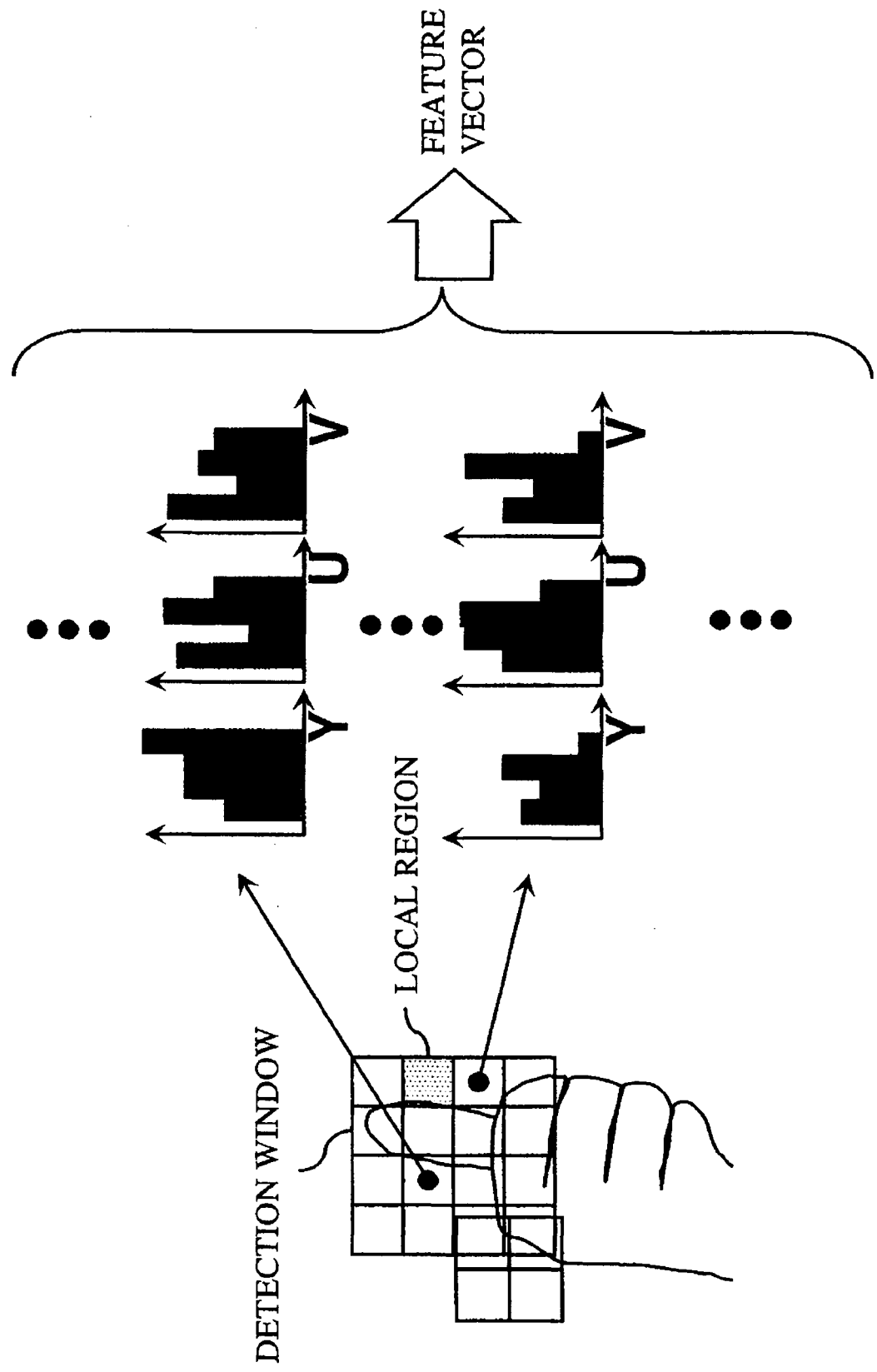
FIG. 4 is a view illustrating a method for calculating a feature vector.

FIG. 4 is a view illustrating the method for calculating a feature vector from a relative color histogram. As for the local region in the detection window, the relative color histogram is formed. Normalization is carried out so that the total of the frequencies of the histogram for each local area is 1. Thus, a feature vector with the normalized relative color histogram as the element position corresponding to the position of the local region is determined.

The local region is simply formed as follows. As in FIG. 4, the inside of the detection window is divided into equal parts without overlapping portions. However, as in Dalal, N., Triggs, B., *HISTOGRAMS OF ORIENTED GRADIENTS FOR HUMAN DETECTION*, IEEE Computer Vision and Pattern Recognition, pp. 886-893, 2005, a feature vector may be calculated in the following manner: several adjacent local regions are grouped, and overlapping of the groups is allowed; thus, normalization is carried out for each group.

The discrimination unit 6 determines whether or not a thumb which is a detection object is present in the detection window by discriminating the feature vector calculated by the feature vector calculation unit 5 with a classifier (not shown). As the classifiers, there can be used existing various ones such as a K nearest neighbor classifier, discriminant analysis, support vector machine (SVM), and neural network. These classifiers are all learning type classifiers, so that training samples become necessary. In this embodiment, a pair of the reference color determined from the reference image region and an image of a detection object (thmb) picked up in the same image is a positive training sample. The negative training sample is a pair of the same reference color and an image not including a thumb. The feature vector is calculated from these training samples in the same manner as the method whereby the feature vector has been determined by the feature vector calculation unit 5. The discriminant function is calculated by the leaning algorithm of each classifier. For example, in the case of linear SVM, the feature vector is evaluated by the discriminant function in the following manner. When the feature vector has a positive value, it is determined that a thumb is present in the detection window. The following is an expression showing an example of the discriminant function.

$$\Sigma_i(a_i t_i x_i^T x) - b > 0$$

where x represents a feature vector, $(t_i, x_i)$ is a set of a correct value of the training sample (for a thumb, $t_i=1$, not for a thumb, $t_i=-1$) and the feature vector, and $a_i$ and b are the coefficient and the threshold value with respect to the training sample determined by the learning algorithm, respectively.

Figure 5:
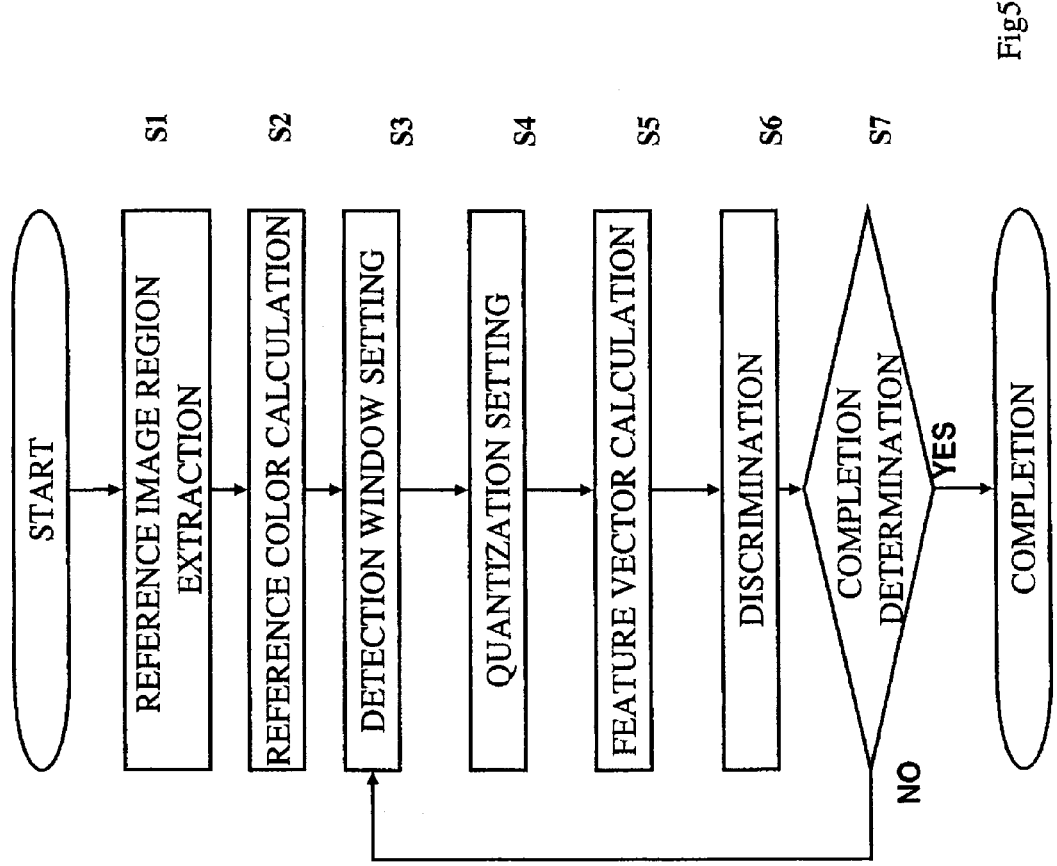
FIG. 5 is a view showing the operation of the image processing apparatus of the first embodiment.

FIG. 5 is a flowchart showing the operation of the image processing apparatus of this embodiment. At S1, a reference image region is extracted by processing of the extraction unit 1. Subsequently, at S2, a reference color is calculated by processing of the reference color calculation unit 2 in the reference image region. At S3, one detection window is set according to processing of the detection window setting unit 3. At S4, setting of quantization of the color space is performed according to the quantization method of the quantization setting unit 4. At S5, the feature vector calculation unit 5 forms a color histogram using the quantization setting determined at S4 and the reference color, thereby to calculate the feature vector. At S6, the discrimination unit 6 discriminates whether or not a detection object is present in the detection window by the feature vector. At S7, when the discrimination processings have been finished for all the detection windows (S7, Yes), the processings are completed. Whereas, when all the processings have not been finished (S7, No), the process returns to S3, where a detection processing for the next detection window is carried out.

Figure 7:
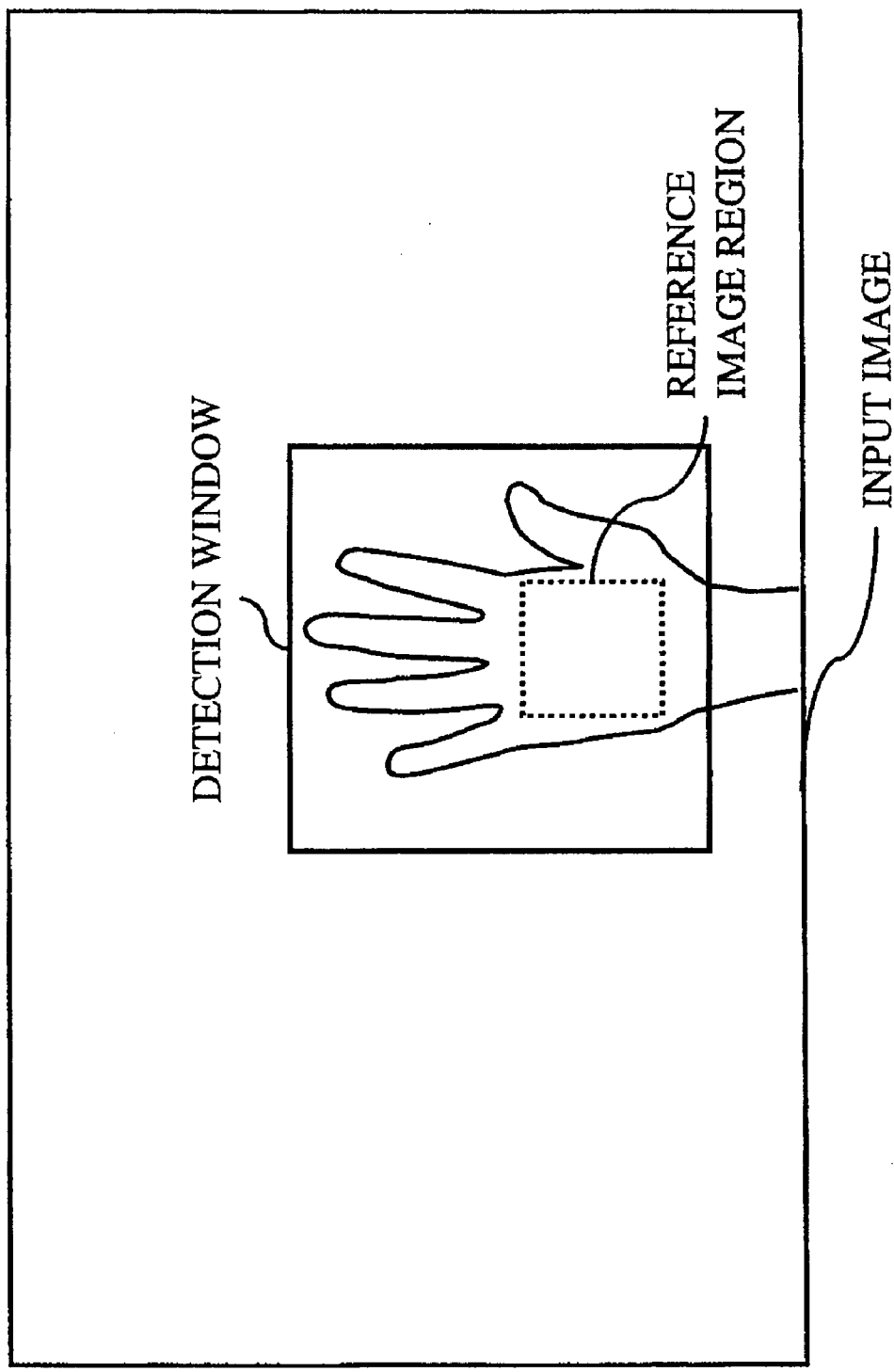
FIG. 7 is a view illustrating a method for setting a reference image region and detection windows.

FIG. 7 is a view showing another example of the detection object and the reference image region. There are conceivable various applications such as a case where the central portion of a human palm is set as a reference image region, and the palm is set as a detection object. In this case, distinct from the example of FIG. 1, a detection window including a region serving as a reference image region is set. As a method for extracting a reference image region in the example of FIG. 7, the reference image region is set at a fixed position relative to the position of the detection window for determining whether or not a detection object is present. This method is effective when a portion or the whole of the detection object is in a uniform color. In other words, setting is performed so that a portion in a uniform color like the palm is selected as the reference image region.

According to the image processing apparatus of this embodiment, for the feature vector, there is used information of how the relative color relation with the reference color is distributed in the detection window. For this reason, a high discrimination performance can be obtained. Information of the difference in color within the image is used, and hence, the processing is less susceptible to the changes in image picking-up conditions. Further, quantization is carried out for both the image position and the color space through the computation of the feature vector. Accordingly, the feature vector is robust against the change in pose and shape. As a result, it is possible to carry out high precision object detection.

Second Embodiment

An image processing apparatus of this embodiment differs in that in addition to the feature vector of the relative color described in the first embodiment, the feature vector on the luminance gradient calculated from the luminance of the input image is used for discrimination.

Figure 6:
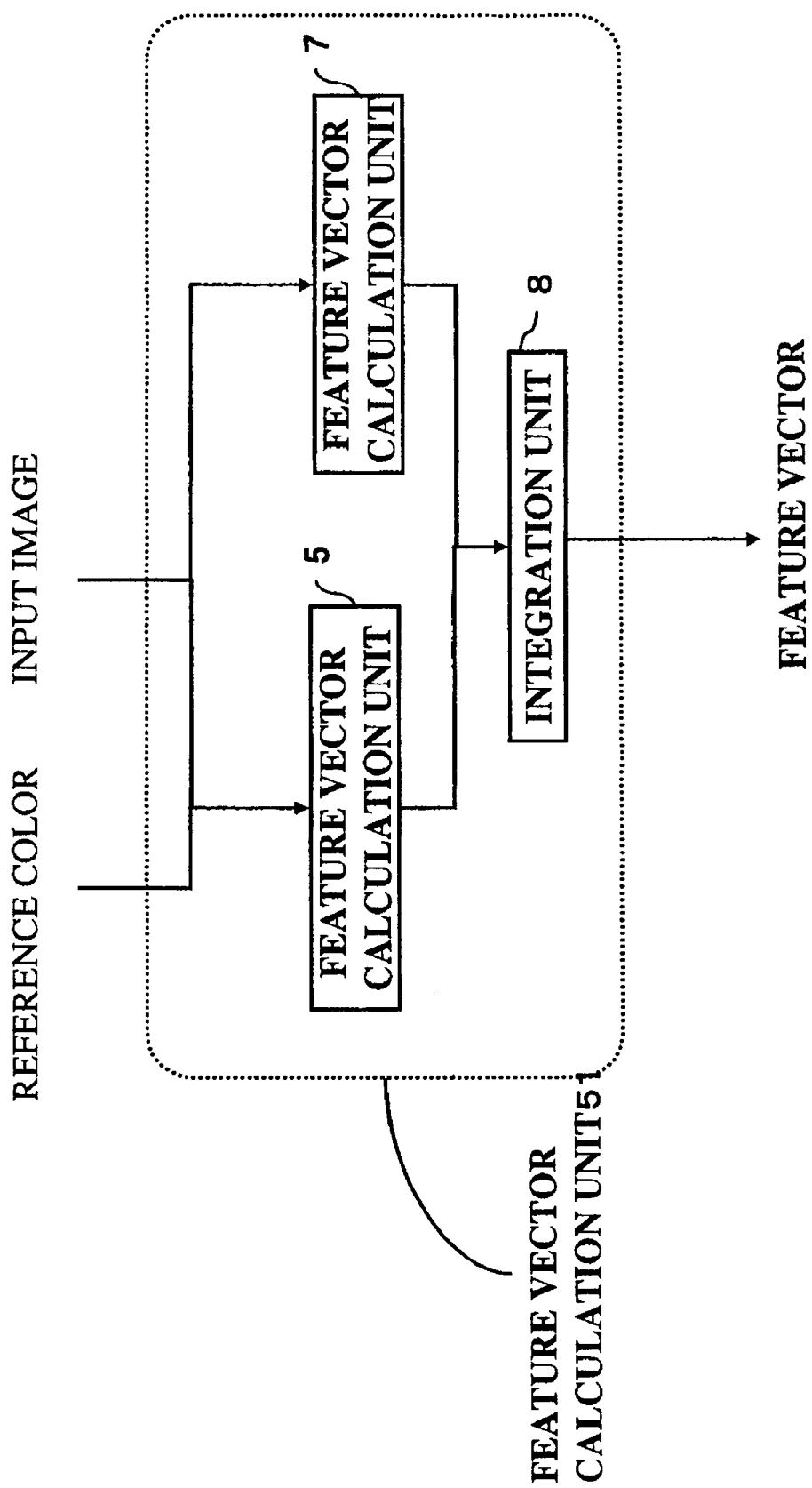
FIG. 6 is a view showing an image processing apparatus of a second embodiment.

FIG. 6 is a view showing a feature vector calculation unit 51 of this embodiment. The feature vector calculation unit 51 includes a feature vector calculation unit 5, a feature vector calculation unit 7, and an integration unit 8. The feature vector calculation unit 5 performs the same processing as with the feature vector calculation unit 5.

The feature vector calculation unit 7 calculates a feature vector using luminance information in the detection window set at the detection window setting unit 3. As a feature vector using such luminance information, existing various ones can be used. For example, there are used Histogram of orientated gradients (HOG) feature using local histograms of luminance gradient direction (see, Dalal, N. and Triggs, B.; *HISTOGRAMS OF ORIENTED GRADIENTS FOR HUMAN DETECTION*, IEEE Computer Vision and Pattern Recognition, pp. 886 to 893, 2005); and *CO-OCCURRENCE HISTOGRAM OF ORIENTED GRADIENTS (COHOG) FEATURE* using local co-occurrence histogram of gradient direction (see, Tomoki Watanabe, Satoshi Ito, and Kentaro Yokoi, *CO-OCCURRENCE HISTOGRAMS OF ORIENTED GRADIENTS FOR PEDESTRIAN DETECTION*, Proceedings of the 3rd Pacific Rim Symposium on Advances in Image and Video Technology, Pages: 37 to 47, 2009).

The integration unit 8 links the feature vector determined by the feature vector calculation unit 5 with the feature vector calculated by the feature vector calculation unit 7 to form a feature vector. At the discrimination unit 6, whether or not a detection object is present in the detection window is determined using the feature vector. Incidentally, a feature vector of the training sample is also calculated with the same method as the method whereby the feature vector calculation unit 51 calculated the feature vector.

By thus additionally using information of luminance gradient, it becomes possible to perform discrimination in consideration of the contour information of the detection object, which can improve the recognition precision.

Third Embodiment

Figure 8:
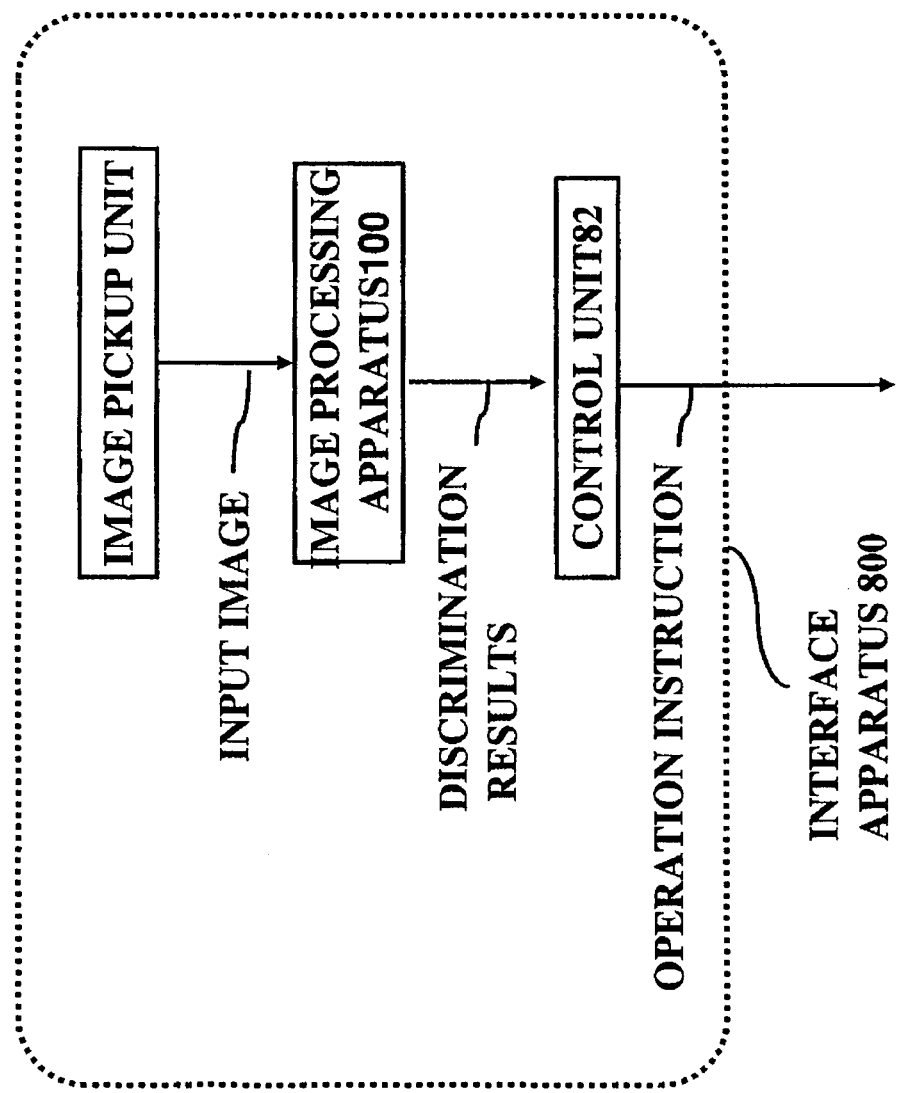
FIG. 8 is a view showing an interface apparatus of a third embodiment.

FIG. 8 is a view showing an interface apparatus of this embodiment. The apparatus is an interface apparatus for an operator to control a control target apparatus to be connected at the subsequent stage by the hand shape or the hand motion.

An image pickup unit 81 picks up an input image including the hand of the operator using an image pickup device such as a CCD or a video camera.

An image processing apparatus 100 is the image processing apparatus of the first embodiment or the second embodiment. It sends whether or not a thumb of the detection object is present in the input image, and the position of the detection object as discrimination results.

A control unit 82 determines the control contents based on the recognized hand gesture type and position, and performs control of the control target apparatus. The type of the hand gesture made by an operator is recognized from the discrimination results in the following manner, for example. The direction of motion is calculated from the temporal history of the position of the fist. Thus, the motion of the fist is recognized as the upward, downward, leftward, or rightward direction command. Thus, it is recognized as a determination command upon detection of a thumb at the upper part of the fist.

The control contents of the control object device (not shown) to be connected at the subsequent stage is formed based on the type of the gesture, so that the control target device is controlled. For example, by mounting in a television or a PC, a command on the device is formed.

Incidentally, each of the embodiments was shown as one example of the gesture recognition method, which should not be construed as limiting the scope of the present invention.

FIG. 1
DETECTION WINDOW
LOCAL REGION
REFERENCE IMAGE REGION
INPUT IMAGE

FIG. 2
INPUT IMAGE
1: Extraction unit
2: REFERENCE COLOR CALCULATION UNIT
3: DETECTION WINDOW SETTING UNIT
4: QUANTIZATION SETTING UNIT
5: FEATURE VECTOR CALCULATION UNIT
6: DISCRIMINATION UNIT
100: IMAGE PROCESSING APPARATUS
DISCRIMINATION RESULTS

FIG. 3
FREQUENCY
BIN
THRESHOLD VALUE
V COMPONENT

FIG. 4
DETECTION WINDOW
LOCAL REGION
FEATURE VECTOR

FIG. 5
START
S1: REFERENCE IMAGE REGION EXTRACTION
S2: REFERENCE COLOR CALCULATION
S3: DETECTION WINDOW SETTING
S4: QUANTIZATION SETTING
S5: FEATURE VECTOR CALCULATION
S6: DISCRIMINATION
S7: COMPLETION DETERMINATION
COMPLETION

FIG. 6
REFERENCE COLOR
INPUT IMAGE
51, 5, 7: FEATURE VECTOR CALCULATION UNIT
8: INTEGRATION UNIT
FEATURE VECTOR

FIG. 7
DETECTION WINDOW
REFERENCE IMAGE REGION
INPUT IMAGE

FIG. 8
81: IMAGE PICKUP UNIT
INPUT IMAGE
100: IMAGE PROCESSING APPARATUS
DISCRIMINATION RESULTS
82: CONTROL UNIT
OPERATION INSTRUCTION
800: INTERFACE APPARATUS

What is claimed is:

1. An image processing apparatus for detecting an object to be detected in an input image, comprising:
    an extraction unit configured to extract a reference image region from the input image;
    a reference color calculation unit configured to calculate a reference color from the reference image region;
    a feature vector calculation unit configured to (a) calculate color differences between color components of each pixel in a detection window being set in the input image and color components of the reference color, (b) calculate a histogram regarding the color differences in each of local regions, the local regions being defined by dividing an inside of the detection window, and (c) calculate a feature vector including the calculated histograms as elements of the feature vector, each of the elements corresponding to the position of each local region in the detection window; and
    a discrimination unit configured to discriminate whether or not the object is included in the detection window based on the feature vector.

2. The apparatus according to claim 1, wherein with the feature vector calculation unit calculates each histogram with a quantization width of color being varied-from one bin to another bin in the histogram.

3. The apparatus according to claim 2, wherein the feature vector calculation unit sets the quantization width narrower within the range of the value of the color component higher in frequency, and setting the quantization width wider in the range of the value of the color component lower in frequency based on color histograms previously calculated from training data of the object.

4. The apparatus according to claim 3, wherein the feature vector calculation unit, further
    (c) determines the gradient direction of the luminance of each local region,
    (d) quantizes the gradient direction, and calculates a gradient histogram regarding the direction for each local region, and
    (e) combines the histogram with the gradient histogram to obtain a combined histogram for each local region, and calculates the feature vector with the combined histograms as its elements corresponding to the positions of the local regions.

5. An interface apparatus for instructing a command to a target apparatus using a part of an operator, comprising:
    an image pickup unit configured to pick up an input image containing the part of the operator;
    an extraction unit configured to extract a reference image region to calculate a reference color from the input image;
    a reference color calculation unit configured to calculate the reference color from the reference image region;
    a feature vector calculation unit configured to (a) calculate a difference for each component in the color space between the color of each pixel in a detection window set in the input image and the reference color, (b) form a histogram regarding the differences in each of local regions obtained defined by dividing a defined by dividing an inside of the detection window, and (c) calculate a feature vector consisting of the calculated histograms as elements of the feature vector, each of the elements corresponding to the position of the local region in the detection window;
    a discrimination unit configured to discriminate whether or not the part of the operator is included in the detection window based on the feature vector; and
    a control unit configured to give a command to the target apparatus depending upon the discrimination result of the discrimination unit.

6. The apparatus according to claim 5, wherein the image pickup unit configured to pick up an input image containing a hand or fingers of the operator.

7. An image processing method for detecting an object to be detected in an input image, comprising:
    extracting a reference image region from the input image;

calculating a reference color from the reference image region;
calculating color differences between color components of each pixel in a detection window being set in the input image and the color component of the reference color;
calculating a histogram regarding the color differences in each of local regions, the local regions being defined by dividing an inside of the detection window, calculating a feature vector including the calculated histograms as elements of the feature vector, each of the elements corresponding to the position of each local region in the detection window; and
discriminating whether or not the object is included in the detection window based on the feature vector.

* * * * *